Patented Apr. 23, 1940

2,197,861

UNITED STATES PATENT OFFICE 2,197,861

PROCESS OF POLYMERIZATION

Julius Hyman, Chicago, Ill., assignor to Velsicol Corporation, Chicago, Ill., a corporation of Illinois No Drawing. Application November 15, 1937, Serial No. 174,656

4 Claims. (Cl. 260—80)

This invention relates to the decolorization and/or polymerization in the liquid phase of water-insoluble, naphtha-soluble substances, such as animal, vegetable, marine and mineral oils, waxes and resins both of the volatile and non-volatile nature, and is characterized in that it uses for the purposes of decolorization and/or polymerization, synthetic, porous granular silicates comprising aluminum ion, such as synthetic aluminum silicate, and this application is a continuation-in-part of my co-pending application Serial No. 81,685 Patent No. 2,137,492, issued Nov. 22, 1938.

Heretofore certain natural aluminosilicates have been used very extensively for the purposes above mentioned. Such natural silicates, however, have been found unsatisfactory for the reason that they must be used with their impurities, and are further undesirable because of their friability and their naturally occurring ratios of aluminum to silicon. At best, their porosities and strength can be altered comparatively slightly.

As opposed to these defects, synthetic aluminosilicates may be prepared in practically any degree of purity, and their strength, porosities and aluminium-silicon ratios may be varied within wide limits. These advantages are extremely important, as it is thus possible to prepare catalytic, porous aluminosilicates best suited for each specific requirement.

The degree of porosity is of primary importance in the production and use of synthetic aluminosilicates. In the case of polymerizing catalysts, only those synthetic aluminosilicates appear usable whose porosities are such as to permit entrance of the unreacted molecules and egress of the polymers. This porosity is reflected in the apparent density of the catalyst, the lower the apparent density the greater being the porosity. Tests which I have made indicate that the maximum apparent density of an active synthetic aluminium silicate should be less than 60, the apparent density being defined as the weight in pounds of a cubic foot of unpacked material which is dry to the touch and has a screen size between 8 and 80 mesh, over 50% of which being of a screen size between 30 and 60 mesh.

It appears that silicates precipitated as gels in an alkaline solution show a greater porosity than those precipitated from a neutral or an acid solution. Alumino-silicates precipitated in an alkaline solution usually possess base-exchange, or, zeolite properties to a greater or lesser degree. Such silicates must be free of water soluble alkali before they will function as polymerization catalysts or color adsorbents. This may be accomplished, for example, by washing or boiling the granular silicate with an aqueous solution of a salt of a polyvalent metallic ion (said ion comprising the cation of the salt) until all excessive alkali has been neutralized. The desired results may also be obtained by washing the aluminosilicate with an aqueous solution of an ammonium salt, washing out the excess of the salt with water, and heating the treated silicate to break down the ammonium aluminosilicate complex and drive off the liberated ammonia. As a pretreatment in preparing synthetic zeolites to function as catalyst and/or adsorbents, it is well first to wash away with water as much alkali and occluded salts as conveniently possible.

If the aluminium silicate is precipitated in a neutral or acid solution, the porosity of the resulting gel may be increased by the addition of water-soluble foreign materials prior to precipitation. After the gel has set, these water-soluble materials may be leached away, thus leaving minute voids which tend to increase the surface—and hence the porosity—of the final dried gel. Voids may also be created by the addition of substances, such as ammonium nitrite, to the gel-forming solutions, which substances tend to gasify on the application of mild heat. This heat may then be applied during the drying and setting period of the gel.

The strength of a synthetic aluminosilicate depends not only on its method of preparation, but also on the ratio of silica to alumina. Other things being equal, the rule is that the greater the percentage of silica in the gel, the stronger and more rigid it will be. However, when the ratio by weight of alumina ($Al_2O_3$) to silica ($SiO_2$) falls below 1 to 25, the quantity of alumina present is so reduced that the gel ceases for practical purposes to be sufficiently active for the uses herein contemplated. On the other hand, when the ratio by weight of alumina to silica rises above equality, the resulting gel is too frangible for ordinary commercial use. An alumina-silica ratio of 1 to 6 appears quite satisfactory for most purposes herein mentioned.

Oils may be decolorized with synthetic aluminosilicates either by the familiar methods of contact filtration or percolation. In the former, adsorbent dust of 100–300 mesh fineness (occasionally coarser material is used) is combined with the oil to form a slurry. This is generally heated to 100–600° F., depending on the viscosity and general nature of the oil, and kept at these temperatures for varying times up to three or four hours.

A commonly used temperature for many oils is 300° F. with a half hour contact time.

After appropriate cooling, the oil slurry is then piped to a filter press, where the separation of oil from spent adsorbent is effected. The pressed adsorbent cake may be treated with naphtha to wash out residual oil held by the cake. Because of its fineness, the adsorbent used in contact filtration is not well suited for reclaiming by ignition, and is usually discarded. It may, however, be treated with strong oxidizing agents, such as hot diluted hydrogen peroxide or potassium permanganate solution, which oxidize the impurities adhering to the adsorbent, and thus reactivate it.

In the treatment of oils by percolation, the oils are passed through a bed of the adsorbent, which will vary from about 8 to 100 mesh in size. As in contact filtration, the temperature of the oil and the time of contact will depend on such factors as the viscosity of the oil, its tendency to decompose, the nature of the colored bodies to be removed, and economic considerations. Because of its size, the spent adsorbent may be readily reactivated by calcining at about 1200° F. in a current of air. Experiments indicate that after a primary calcining the synthetic aluminosilicates may be recalcined as often as desired, without apparent reduction in decolorizing and/or polymerizing activity, provided the adsorbents are not sintered in the calcining. However, synthetic aluminosilicates appear to be much more stable than the naturally occurring aluminosilicates in this respect.

It will also be seen that an adaptation of the percolation method may be utilized in the decolorization and filtering of automobile lubricating oils during operation of the motor vehicle, by using a filter cell containing my synthetic aluminium silicate adsorbent and continuously by-passing through it oil from the crank case of the automobile.

The decolorization of resins, fats and waxes may be accomplished either by treating them in a molten condition in the aforementioned manners, or preferably by first dissolving them in an appropriate hydrocarbon solvent, such as petroleum naphtha. In order to prevent the naphtha from evaporating, it may be necessary to carry out the decolorizing treatment under superatmospheric pressures.

In the polymerization of light unsaturated oils it is usually necessary to carry out the reaction under pressure. Either batch (contact filtration) or continuous (percolation) polymerization may be carried out, the pressure exerted being sufficient to keep most of the light oil in the liquid phase. Such unsaturated hydrocarbons, for example, as isoprene, styrene, indene, and olefins, may be polymerized in liquid phase by synthetic aluminosilicates, and the resulting reactions produce increases in temperature often exceeding 200° F. The severity of the reaction is dependent upon the activity of the catalyst, the time of contact, the temperature of the oil at which the reaction is initiated and the presence in the oil of such modifying agents as water, ammonia, alcohols, organic acids or organic chlorides. The lower the activity of the catalyst, the shorter the time of contact, the lower the initial temperature, the lower will be the severity of the polymerization. Water, ammonia and alcohols decrease the severity of polymerization. The presence of organic acids and chlorides appears generally to increase the severity of the polymerization. After polymerization, and separation from the catalyst, the unreacting oils may be separated from the polymers by distillation.

Examples of oils amenable to the polymerization and/or decolorization are light highly unsaturated naphthas such as the coumarone-indene coal tar distillate cut, cracked gasolines and naphthas produced by the polymerization of gases.

Examples of oils amenable to adsorptive decolorization are Mid-Continent lubricating oil fractions, crude cottonseed oil and crude neat's-foot oil.

Examples of decolorizable solids are dark varieties of rosin, coumarone-indene resins and petroleum resins.

Having thus described my invention, I claim as my invention:

1. In the polymerizing treatment of light unsaturated mineral oils the step which comprises subjecting said oils to the action of a solid, porous, synthetic aluminium silicate under pressure adapted to maintain said oils in essentially a liquid phase, said aluminum silicate containing a weight ratio of alumina to silica between approximately 1:1 and 1:25 and being much more stable than naturally occurring alumino silicates against loss of activity upon repeated calcining.

2. In the polymerization treatment of hydrocarbon liquids containing readily polymerizable unsaturated constituents, the step which comprises subjecting said liquids to the action of a solid, porous, synthetic aluminum silicate substantially free of water-soluble alkali, under pressure adapted to maintain said hydrocarbons in essentially a liquid phase, said aluminum silicate containing a weight ratio of alumina to silica between approximately 1:1 and 1:25 and being much more stable than naturally occurring alumino silicates against loss of activity upon repeated calcining.

3. In the polymerization treatment of normally liquid hydrocarbon mixtures containing unsaturated components, the step which comprises subjecting said mixtures to the action of granular, porous, synthetic, complex silicates comprising aluminum ion under pressure adapted to maintain said hydrocarbon mixtures in essentially a liquid phase said complex silicates containing a weight ratio of alumina to silica between approximately 1:1 and 1:25 and being much more stable than naturally occurring alumino silicates against loss of activity upon repeated calcining.

4. In the polymerization and decolorization treatment in the liquid phase of hydrocarbon mixtures containing unsaturated constituents, the step which comprises subjecting said mixtures to the action of a catalytic adsorbent substance containing solid, porous, synthetic aluminum silicate under pressure adapted to maintain said mixtures in essentially a liquid state, said aluminum silicate containing a weight ratio of alumina to silica between approximately 1:1 and 1:25 and being much more stable than naturally occurring alumino silicates against loss of activity upon repeated calcining.

JULIUS HYMAN.